J. Sutter,
Bed Bottom,
N° 42,602. Patented May 3, 1864.

Witnesses.
Thos. Geo. Harold
Chas. H. Smith

Inventor
Joseph Sutter

UNITED STATES PATENT OFFICE.

JOSEPH SUTTER, OF NEW YORK, N. Y.

IMPROVED BOTTOM FOR CHAIRS AND SOFAS.

Specification forming part of Letters Patent No. 42,602, dated May 3, 1864.

*To all whom it may concern:*

Be it known that I, JOSEPH SUTTER, of the city and State of New York, have invented, made, and applied to use a certain new and useful Improvement in Spring-Bottoms for Chairs, Sofas, &c.; and I do hereby declare the following to be a full, clear, and exact description of the said invention, reference being had to the annexed drawings, making part of this specification, wherein—

Figure 1:
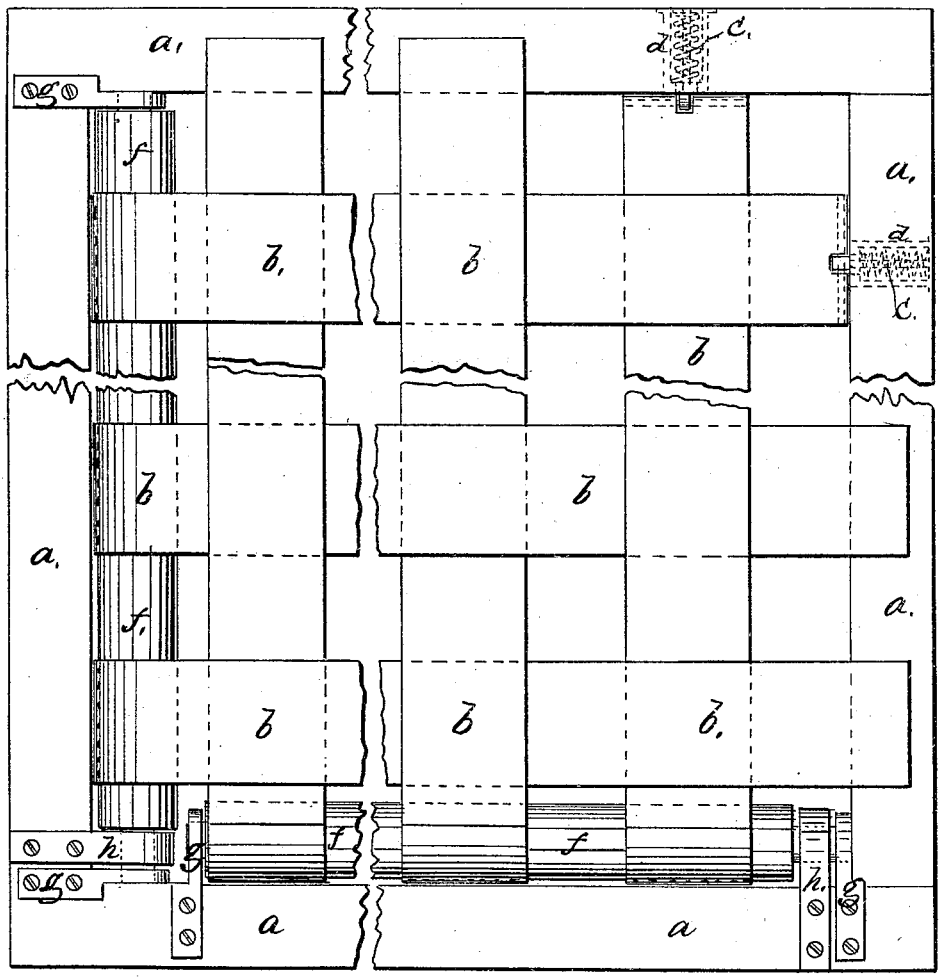
Figure 2:
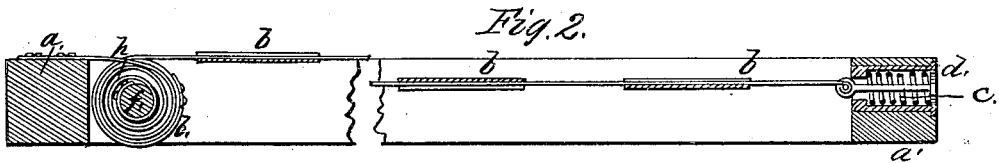

Figure 1 is a plan, and Fig. 2 is section, of a frame for a chair, sofa, or bed bottom fitted with my improvement.

Similar marks of reference denote the same parts in each of the figures.

The nature of my said invention consists in springs applied at the ends of interlaced webbing, so as to draw such webbing out straight and flat, or nearly so, when not under strain, and which springs yield or are compressed by a superincumbent weight, causing the webbing to accommodate itself to the shape of the person and take an even bearing, so as to form, with a suitable covering or padding, an easy and comfortable seat or lounge.

In the drawings, $a$ $a$ represent a frame of any suitable size or shape adapted to the given object. $b\,b$ are the strips of webbing interlaced to form the bed, chair, sofa, or lounge bottom. $c\,c$ are helical springs inclosed in a case or socket, $d$, which for convenience may be round and formed with a flange, so as to be introduced from the outside of the frame $a$, and not be drawn through the hole in said frame by the tension of the webbing. This webbing is united at its end to the rod $e$, that is provided with a head or follower that acts to compress the springs when the webbing is under strain or causes the spring to draw the webbing out straight when that strain is removed. This character of spring may be applied at both ends of the pieces of webbing, or, if preferred, the ends of the pieces of webbing may be passed around a roller, $f$, sustained in supports $g$ and provided with a coiled spring, $h$, that acts to wind the webbing on the roller, but yields when strain is applied to the webbing.

It will be seen that both these devices act upon the webbing in a corresponding manner to keep the same under strain and out flat.

What I claim, and desire to secure by Letters Patent, is—

The springs applied to the ends of the webbing to draw the same out flat, or nearly flat, when not under strain, or to allow said webbing to yield to a weight, as specified.

In witness whereof I have hereunto set my signature this 30th day of March, 1864.

JOSEPH SUTTER.

Witnesses:
LEMUEL W. SERRELL,
THOS. GEO. HAROLD.